No. 864,934. PATENTED SEPT. 3, 1907.
C. L. TAYLOR.
FURNACE CHARGING APPARATUS.
APPLICATION FILED MAY 6, 1905.
3 SHEETS—SHEET 1.
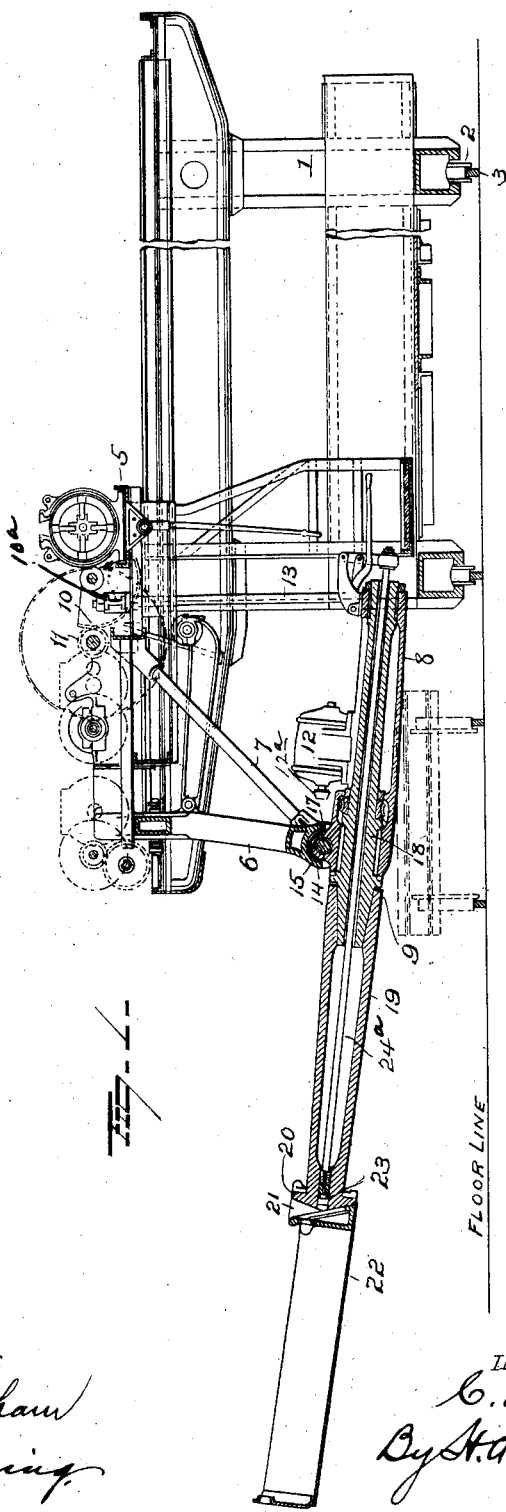
WITNESSES
E. J. Nottingham
G. F. Downing
INVENTOR
C. L. Taylor
By H. A. Seymour
Attorney No. 864,934. PATENTED SEPT. 3, 1907.
C. L. TAYLOR.
FURNACE CHARGING APPARATUS.
APPLICATION FILED MAY 6, 1905.
3 SHEETS—SHEET 2.
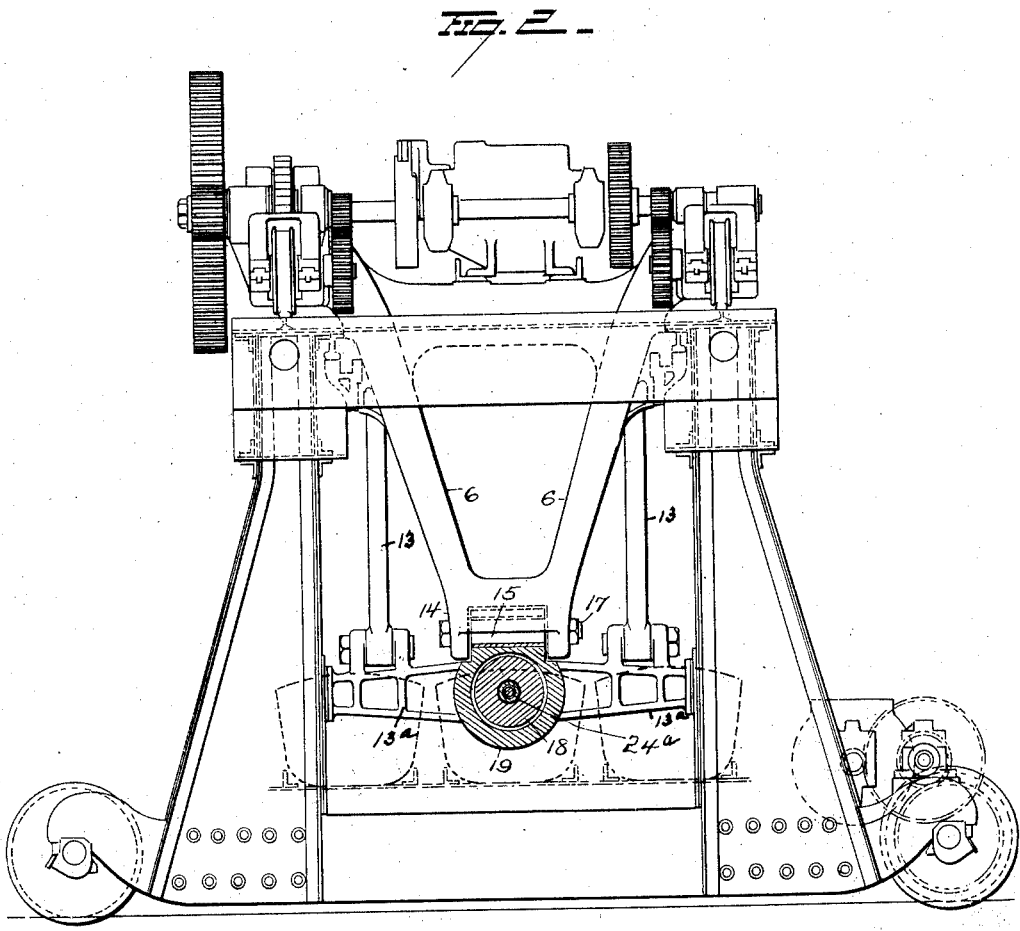

No. 864,934. PATENTED SEPT. 3, 1907.
C. L. TAYLOR.
FURNACE CHARGING APPARATUS.
APPLICATION FILED MAY 6, 1905.
3 SHEETS—SHEET 3.
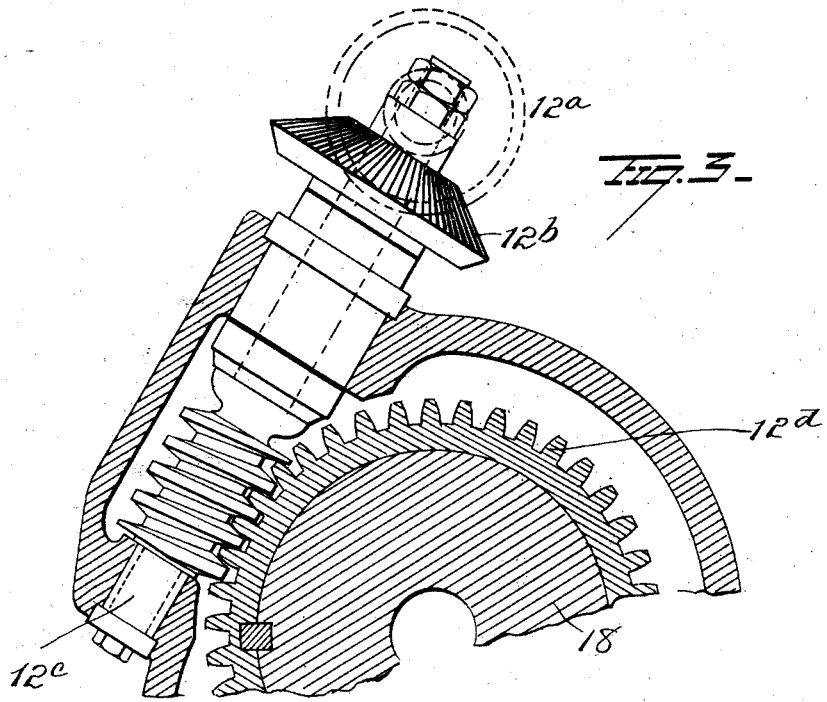
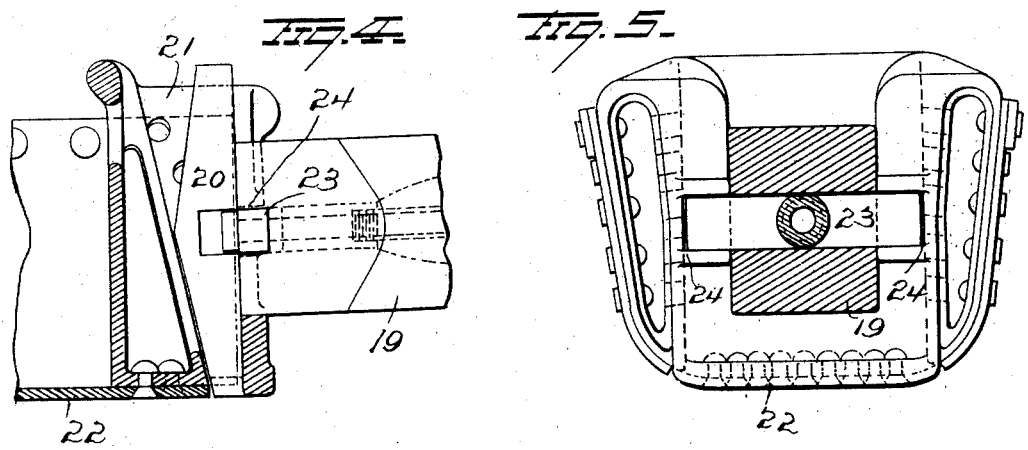
WITNESSES
INVENTOR
C. L. Taylor
By H. A. Seymour
Attorney

UNITED STATES PATENT OFFICE.

CLARENCE L. TAYLOR, OF ALLIANCE, OHIO, ASSIGNOR TO THE MORGAN ENGINEERING COMPANY, OF ALLIANCE, OHIO.

FURNACE-CHARGING APPARATUS.

No. 864,934.   Specification of Letters Patent.   Patented Sept. 3, 1907.

Application filed May 6, 1905. Serial No. 259,165.

*To all whom it may concern:*

Be it known that I, CLARENCE L. TAYLOR, of Alliance, in the county of Stark and State of Ohio, have invented certain new and useful Improvements in Furnace-Charging Apparatus; and I do hereby declare the following to be a full, clear, and exact description of the invention, such as will enable others skilled in the art to which it appertains to make and use the same.

My invention relates to an improvement in furnace charging apparatus, and particularly to the charging bar and the manner of mounting the same, and it consists in the parts and combinations of parts as will be more fully described and pointed out in the claims.

In the accompanying drawings, Figure 1 is a view in side elevation of a charging machine embodying my invention, Fig. 2 is an end view of same showing the charging bar in section. Fig. 3 is a view in section showing the arrangement of the worm drive for the charging bar, and Fig. 4 is a view in longitudinal section of a portion of the charging box and bar showing the mechanism for locking the box to the bar, and Fig. 5 is a view in transverse section through the bar in rear of the box.

1 represents a traveling frame mounted on flanged wheels 2 which latter travel on the rails 3. This traveling frame may be of any form or construction, and carries on its upper side rails on which the trolley 5 travels. Depending from the trolley 5 is the yoke 6 and brace 7, which support and brace the charging bar carrying frame 8. The rear end of the charging bar carrying frame, is connected to the guide beam 13ª which latter rests between and is guided by the forward uprights of the traveling frame 1 as shown in Fig. 2. This guide beam 13ª is suspended from the rods 13 which latter are attached at their upper ends to the cross beam 10ª carried by segmental gears 10 one of which is shown in Fig. 1. These segmental gears 10 mesh with pinions 11 hence it will be seen that when the segmental gears are moved, the cross beam 10ª and its attached rods 13 will be moved up and down thus elevating or lowering the rear end of the charging bar. The charging bar is rotated by the motor 12 mounted thereon, and provided on its armature shaft with a pinion 12ª meshing with the pinion 12ᵇ secured on the obliquely arranged worm shaft 12ᶜ, which latter engages a worm gear 12ᵈ embracing and secured to the charging bar.

I have not described in detail, nor do I claim herein, the particular form or structure of frame 1, nor the details of the trolley, nor the specific means shown for rotating and rocking the charging bar, as these details form no part of the present invention.

My improvement consists in the manner of mounting the charging bar, and the construction of the head of the latter, consequently the improvements can be applied to any approved form of carrier.

The yoke 6 depends from the trolley 5 and is provided with a bifurcated lower end 14 which receives the bearing 15 on the charging bar casing or carrier 8. The bearing 15 is integral with the carrier 8, and is provided with straight sides and a rounded top. The straight sides of the bearing 15, rest snugly between the adjacent faces of the members of the bifurcated end 14 of the yoke 6, while the rounded top rests within the similarly shaped recess 16 formed in the yoke 6, thus permitting of the free rocking movement of the carrier 8 within the necessary limits, but positively restricting it from lateral movement. The bearing thus formed is pivotally secured to the yoke by the pin 17, which latter passes through both members of the bifurcated end of the yoke 6 and through the bearing 15, thus rendering it a very simple matter to assemble the parts, and to remove the carrier 8 when necessary for any repairs to be made to it, or to the charging bar 9 carried by the carrier.

Heretofore the carrier 8 has been provided with side trunnions located in a plane passing through the longitudinal center of the bar 8. With such a construction the yoke or support carrying same, must, in order to permit of the assembling of the parts, be made in sections or provided with removable bearings. By locating the pivotal point of the charging bar 9 or carrier 8 above the center as shown, I not only provide for the easy assembling of the parts, but I am enabled to make the bearings in the yoke and carrier solid and integral, and the pivot pin 17 removable, hence the latter can be readily renewed when worn. The charging bar 9 is mounted to rotate in the carrier 8 and is as shown made of two parts, one part 18 of which is mounted at its end in the carrier 8 and projects from the latter at its front end, while the other section 19 which is exposed and subjected to wear, hard usage and the intense heat of the furnace, is removably secured to the projecting end of the section 18 so as to permit it to be removed for repairs or renewal without disturbing the rear section 18. This outer section 19 of the charging bar, is provided with a double wedge shaped head 20 which latter is designed to enter a pocket 21 in the charging box 22, the said pocket having a straight front wall, and an inclined rear wall as shown. Mounted in this head midway between its ends is a sliding lock 23 which latter is adapted, when moved rearwardly or away from the charging box 22, to enter recesses 24 in the pocket of the latter and thus lock the head 20 of the charging bar 9 in the pocket 21. This lock 23 is connected to the sliding rod 24ᵃ which passes lengthwise through the charging bar 9 and is connected at its rear end to any suitable means for actuating it.

With a double wedge shaped head, the charging bar can be used either side up. Again by the use of a pocket in the charging box with a wide opening at the top, and making the head of the charging bar of wedge shape with the point of the wedge downward, the operator does not have to exercise that care in locating the machine so as to have the head enter the charging box, as he does when the head is curved and pocket similarly shaped.

It is evident that many slight changes might be resorted to in the relative arrangement of parts shown and described without departing from the spirit and scope of my invention hence I would have it understood that I do not wish to confine myself to the exact construction shown and described, but, Having fully described my invention what I claim as new and desire to secure by Letters-Patent, is:—

1. In a furnace charging apparatus, the combination with a casing provided with an upwardly projecting bearing, and a charging bar provided with a double head and mounted to rotate in the casing, of a support, a pin passing through the bearing on the casing and through the support, means carried by the casing for rotating the charging bar, and means for rocking the casing.

2. In a furnace charging machine, the combination with a casing provided on its upper side with an upwardly projecting bearing, and a charging bar provided with a double wedge shaped head and mounted to rotate in said casing, of a depending yoke and a pivot pin passing through the lower end of said yoke and the upwardly projecting bearing on the charging bar.

3. A charging bar having a double wedge shaped head.

4. A charging bar having a double wedge shaped head and a sliding lock carried by said head.

5. A charging bar having a double wedge shaped head, a sliding lock in the latter and a rod connected to the lock and passing rearwardly through the bar.

6. In a furnace charging apparatus, the combination with a casing and a charging bar having a wedge shaped head the latter being flat on its rear face, of a traveling trolley having a depending support to which the casing is pivoted in a plane above the axis of the charging bar, substantially as set forth.

In testimony whereof, I have signed this specification in the presence of two subscribing witnesses.

CLARENCE L. TAYLOR.

Witnesses:
A. L. ROBERTS,
N. C. FETTERS.